United States Patent [19]

Seidel

[11] 4,220,852

[45] Sep. 2, 1980

[54] RADIATION DOSIMETER ASSEMBLY

[75] Inventor: John G. Seidel, McCandless, Pa.

[73] Assignee: Westinghouse Electric Corp., Pittsburgh, Pa.

[21] Appl. No.: 941,995

[22] Filed: Sep. 13, 1978

[51] Int. Cl.² .......................... G01V 5/00; G01T 1/11; H05B 33/00
[52] U.S. Cl. .................................. 250/253; 250/337; 250/484
[58] Field of Search ......................... 250/253, 337, 484

[56] References Cited

U.S. PATENT DOCUMENTS

| | | | |
|---|---|---|---|
| 3,300,643 | 1/1967 | McCall | 250/484 |
| 3,419,720 | 12/1968 | Debye et al. | 250/337 |
| 3,471,699 | 10/1969 | McCall | 250/484 |
| 3,883,748 | 5/1975 | Nada et al. | 250/484 |
| 4,053,772 | 10/1977 | Felice | 250/337 |
| 4,064,436 | 12/1977 | Ward | 250/253 |
| 4,065,972 | 1/1978 | Holub et al. | 73/421.5 R |

Primary Examiner—Davis L. Willis
Assistant Examiner—Janice A. Howell
Attorney, Agent, or Firm—M. P. Lynch

[57] ABSTRACT

In a radiation dosimeter assembly consisting of a wafer-like radiation dosimeter in combination with a mechanical support member the radiation dosimeter is secured within an aperture of the support member by disposing a protective film on either side of the dosimeter and securing the film to the support member via a high temperature adhesive or high temperature adhesive film. This assembly technique permits the annealing of the combination of the dosimeter and the support member to a temperature of about 300° C. which is the typical process for "erasing" extraneous radiation dosage stored in the dosimeter prior to the use of the radiation dosimeter/support combination for radiation measurements. The capability of annealing the total combination permits stock piling of preassembled radiation dosimeter/support member combinations for extended periods of time.

4 Claims, 3 Drawing Figures

RADIATION DOSIMETER ASSEMBLY

BACKGROUND OF THE INVENTION

Thermoluminescent radiation dosimeters, sensitive to randon emanating from the earth, have found widespread use in uranium exploration applications. Typically, a thin, i.e. 1 to 3 mils, wafer-like radiation dosimeter of a diameter between one-quarter and one-half inch is supported within an inverted cup member which is buried beneath the surface of the ground for a period of weeks during which time the radiation dosimeter stores a radiation level corresponding to the presence of radon gas. The radiation dosimeter assembly is then removed from the earth and the dosimeter is removed from the support member. The thermoluminescent dosimeter, which typically consists of a thermoluminescent phosphor such as calcium sulfate/dysprosium in combination with a binder such as Teflon, is inserted within a radiation reading apparatus which heats the dosimeter causing the dosimeter to emit light. The light is measured as an indication of the level of radiation to which the dosimeter was exposed while buried beneath the surface of the ground. Typical thermoluminescent radiation dosimeters are described in issued U.S. Pat. Nos. 3,883,748 and 3,471,699. A typical technique for reading the radiation dosimeter is described in U.S. Pat. No. 3,300,643. Illustrations of the positioning of a radiation dosimeter within an inverted cup for subsurface uranium exploration can be found in U.S. Pat. Nos. 4,064,436 and 4,065,972.

An improved subsurface radiation dosimeter for uranium detection based on the sensitivity of the dosimeter to alpha particles, is described in U.S. Pat. No. 4,053,772, issued Oct. 11, 1977, entitled "Locating Underground Uranium Deposits", and which is assigned to the assignee of the present invention and incorporated herein by reference. In the pending patent application Ser. No. 874,976, filed Feb. 3, 1978, entitled "Improved Thermoluminescent Dosimeter System", assigned to the assignee of the present invention, there is disclosed a technique for protecting the dosimeter from contamination by moisture and soil conditions.

Uranium exploration is typically a seasonal undertaking during which time thousands of radiation dosimeters are required to achieve the desired mapping, or surveying, for the purposes of locating uranium deposits. It would be most desirable to develop a large inventory, or stock pile, of the radiation dosimeter assemblies in preparation for the seasonal uranium exploration activity. Stock piling of the radiation dosimeter assemblies over a period of time results in the build-up of a random radiation dosage in the dosimeters from surrounding ambient conditions. Thus, in order to "erase" this undesired radiation storage in the dosimeter, the radiation dosimeter is annealed to temperatures of approximately 300° C. to erase the undesired radiation storage and prepare the radiation dosimeter assembly for field use. Conventional assembly techniques, however, employ materials which are not capable of withstanding the annealing temperature and thus reduce the opportunity for the desired stock piling of preassembled radiation dosimeter/support member combinations.

SUMMARY OF THE INVENTION

There is disclosed herein with reference to the accompanying drawings a technique for securing a radiation dosimeter within the aperture of a support member utilizing material capable of withstanding the annealing temperature of 300° C. A thin film material, i.e., aluminum or aluminized polyimide, covers either side of the radiation dosimeter as it is positioned in the aperture of the support member. The thin foil is secured to the support member by high temperature adhesive film such as Teflon or Kapton having a silicon adhesive on one side. These adhesive films are commercially available and will withstand the annealing temperature without weakening. As an alternative to these commercially available adhesive films, ceramic or silicon glues can also be used to secure the thin film to the support member. The film, which is sufficiently thin to be essentially transparent to the radiation to be measured, functions as a dosimeter retainer while also protecting the dosimeter from moisture and other soil conditions during field use.

The capability of stock piling preassembled radiation dosimeter/support member combinations secured within a cup enclosure can be realized by fabricating the cup enclosures from a heavy gauge aluminum foil rather than the conventional plastic cup enclosures. Inasmuch as the aluminum cup can withstand the annealing temperature the entire aluminum cup, radiation dosimeter/support member combination can be preassembled and stored for several months and subsequently subjected to an annealing process prior to field use. Fabricating the cup enclosures from aluminum foil would not only provide the desired strength but would eliminate the deterioration experienced with plastic cups resulting from the plastic cups becoming brittle and cracking when exposed to cold weather conditions.

DESCRIPTION OF THE DRAWINGS

The invention will become more readily apparent from the following exemplary description in connection with the accompanying drawings.

DESCRIPTION OF THE PREFERRED EMBODIMENT

Figure 1:
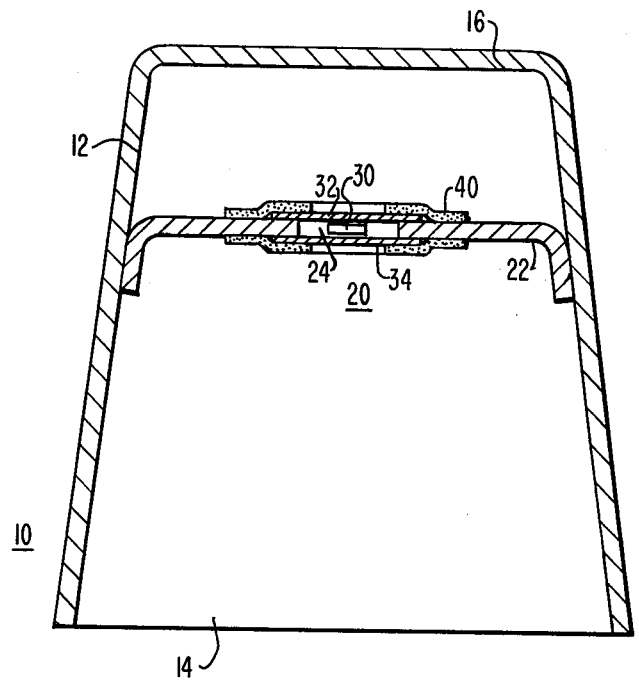
FIG. 1 is a sectioned schematic illustration of a radiation dosimeter/support assembly constructed in accordance with the invention and secured within a cup enclosure suitable for subsurface exploration.
Figure 2:
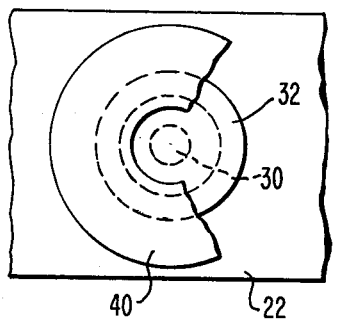
FIG. 2 is a top view of the radiation dosimeter/support member of FIG. 1.

Referring to FIGS. 1 and 2 there is illustrated a radiation monitoring device 10 consisting of a cup-like enclosure 12 having an open end 14 and a closed end 16 and including a radiation dosimeter/support member combination 20 secured within the cup-like enclosure 12.

The radiation dosimeter/support member combination 20 consists of a support bracket 22 having an aperture 24. A disc-like radiation dosimeter 30, typically of a thickness between 1 and 3 mils, is located within the support aperture 24. Thin protective film members 32 and 34 are positioned on either side of the radiation dosimeter 30 to retain the radiation dosimeter 30 within the support aperture 24. The thin protective film members 32 and 34 are secured to the support member 22 by adhesive film or glue, herein depicted as adhesive film elements 40 which will withstand annealing temperature of approximately 300° C. without structural or functional deterioration.

The radiation dosimeter/support member combination 20 is secured to the inside wall of the cup-like enclosure 12 by any suitable mechanical or adhesive means which will withstand bot the annealing process and the mechanical handling resulting from field use of the radiation monitoring device 10. Silicone glue has proven to be a suitable material for securing the radiation dosimeter/support member combination 20 to the inside wall of the cup-like enclosure 12.

The radiation dosimeter 30 is a thermoluminescent dosimeter comprised of a phosphor material which after exposure to radiation, such as alpha particles, gives off light, or luminesces, when heated to a characteristic temperature. The radiation causes some of the electrons of the phosphor material to be raised to an excited state where they remain trapped for an extended time unless the phosphor is heated to a characteristic temperature. Upon heating, the excited state electrons return to the ground state, giving off a pulse of light at a characteristic wave length. The phosphor material may be formed as a compact body or mixed and compacted within a carrier such as polytetrafluoroethylene. A variety of phosphor materials are known which exhibit thermoluminescence, such as activated lithium and calcium fluorides, and calcium sulfate activated by dysprosium.

The wafer-like radiation dosimeter 30 of FIG. 1 is a very thin disc of about 1 to 3 mils thickness.

The thin protective members 32 and 34 are of a material and a thickness which not only withstands the annealing temperature readily admits the radiation of interest while minimizing the transmission of light and particularly ultraviolet light for contacting the radiation dosimeter 30. Ultraviolet radiation can result in the excited electrons returning to the ground state thus destroying the stored radiation information of the dosimeter 30.

Figure 1A:
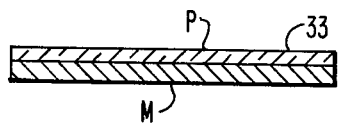
FIG. 1A is a sectioned illustration of a metalized film of FIG. 1.

Suitable materials for satisfying the above requirements for the thin protective members 32 and 34 include aluminum foil of a thickness of approximately 0.03 mils, and metalized plastic layers, such as aluminized polyimide, wherein the metalized surfaces preferably are positioned adjacent to the radiation dosimeter 30. The metal and plastic layers are very thin so as to be transmissive to alpha, beta and gamma radiation, with the metal layer being sufficiently effective to absorb ultraviolet radiation. The thin plastic layer provides high tensile strength and serves the additional function of protecting the radiation dosimeter 30 from contamination by moisture and soil conditions when in field use. An illustration of the plastic/metal laminate as the thin protective members 32 and 34 is illustrated in FIG. 1A. The metalized plastic sheet 33 of FIG. 1A comprises a thin, i.e., 300 angstroms, aluminum layer A disposed on a thin, i.e., about 0.15 mils or 4 micrometers, high tensile strength plastic layer P of a polyester material such as polyimide.

Materials which would be suitable substitutes for aluminum in the above discussion of the thin protective members 32 and 34 include copper, silver and gold.

The bonding members 40 used to secure the thin protective members 32 and 34 to support member 22 to retain the radiation dosimeter 30 within the support aperture 24 as implemented through the use of adhesive material suitable for withstanding the 300° C. annealing temperature. Particularly suitable, commercially available adhesive materials, include adhesive backed Teflon, and adhesive backed Kapton. Successful bonding of the thin protective members 32 and 34 has also been realized through the use of commercially available ceramic or silicone glues capable of withstanding the 300° C. annealing temperature suitable adhesives include the ceramic adhesive Cermabond by REMCO Product, Inc., and the silicone adhesive RTV 732 by Corning.

While it is conventional practice to use a plastic cup structure to serve as the enclosure 12, the plastic cup becomes brittle during cold weather field use rendering the plastic cup susceptible to cracking.

The replacement of the conventional plastic cup with a metal cup not only overcomes the problem of cracking due to weather conditions, but also permits the total assembly of the radiation dosimeter/support member combination 20 in the enclosure 12 for stock piling inasmuch as the metal cup will withstand the 300° C. annealing process as described above. Thus a total assembly of the radiation measuring device 10 can be achieved many months prior to the actual field use with the only requirement for field use being the annealing of the total radiation measuring device, including a metal cup enclosure 12, immediately prior to field use. The metal cup structure can be fabricated from heavy gauge aluminum foil, i.e., 15 to 25 mils, or from other suitable materials such as steel or polyimide of comparable thickness.

What is claimed is:

1. In a radiation monitoring apparatus for location beneath the surface of the earth to monitor radiation emanating therefrom, the combination of:
   a cup-like housing member; and
   a radiation dosimeter means consisting of a support means and a radiation dosimeter secured to said support means, said radiation dosimeter responding to heating by releasing stored radiation energy, said radiation dosimeter means being secured within said cup-like housing member;
   the materials of said cup-like housing member and said support member being capable of withstanding a temperature suitable for releasing stored radiation from said radiation dosimeter.

2. The apparatus of claim 1 wherein said cup-like housing member is a metal cup member of heavy gauge aluminum foil of between about 15 to 25 mils.

3. The apparatus of claim 1 wherein said support member has an aperture therein, said radiation dosimeter being a wafer-like member positioned within said aperture, and further including:
   thin protective metalized plastic film member disposed on either side of said aperture covering said entire aperture and extending onto the surface of said support member; and
   adhesive means for securing said protective films to said support member.

4. The apparatus of claim 3 wherein said metalized plastic film members consist of an aluminum layer of about 300 angstroms thickness disposed at intimate contact with a high tensile strength plastic layer of about 0.15 mils thickness.

* * * * *